United States Patent [19]
Deki

[11] Patent Number: 4,768,198
[45] Date of Patent: Aug. 30, 1988

[54] SYSTEM FOR CONTROLLING OUTPUT OF PULSED LASER

[75] Inventor: Kyoichi Deki, Himeji, Japan

[73] Assignee: Ushio Denki, Tokyo, Japan

[21] Appl. No.: 883,674

[22] Filed: Jul. 9, 1986

[30] Foreign Application Priority Data

Sep. 21, 1985 [JP] Japan .................................. 60-207797

[51] Int. Cl.$^4$ .............................................. H01S 3/13
[52] U.S. Cl. ........................................ 372/29; 372/30; 372/31; 372/25; 372/38
[58] Field of Search ...................... 372/29, 30, 31, 38, 372/25

[56] References Cited

U.S. PATENT DOCUMENTS

| B 322 | 8/1987 | Simons .................................. 372/31 |
| 4,577,320 | 3/1986 | Yoshikawa et al. .................. 372/38 |
| 4,611,352 | 9/1986 | Fujito et al. ........................... 372/38 |
| 4,621,376 | 11/1986 | Nakamura et al. .................... 372/38 |

Primary Examiner—James W. Davie
Assistant Examiner—Georgia Y. Epps
Attorney, Agent, or Firm—Armstrong, Nikaido, Marmelstein & Kubovcik

[57] ABSTRACT

The present invention is for a pulsed laser system in which the total irradiation energy of the laser is controlled by the number of the laser pulses. The invention includes a device for controlling the output of the laser so that the laser oscillation is stopped when the sum of the laser outputs, in response to each pulses, has reached a predetermined level. This device comprises a laser oscillator for outputting a laser beam in response to a repetitive pulse discharge, a photoelectric conversion element, a sample hold circuit and an integrator for sampling and integrating the outputs from the photoelectric conversion elements, and a comparator for comparing the output of the integrator and the output from a reference voltage generator.

3 Claims, 2 Drawing Sheets

SYSTEM FOR CONTROLLING OUTPUT OF PULSED LASER

BACKGROUND OF THE INVENTION

1. Field of the Invention

This invention relates to a system for controlling the output power of the laser beam which oscillates in accordance with pulse discharge and, more particularly, to a device for maintaining a constant total output power of a laser.

2. Description of the Prior Art

Various methods have been proposed for obtaining a stable laser output from ordinary discharge-exciting type laser, such as negative feedback of the load current to the power supply, thereby controlling the discharge current. A pulsed laser, such as excimer laser, is difficult to obtain a constant laser output power in each pulse discharge.

On the other hand, a pulsed laser can suitably be used in carrying out photolithography in a semiconductor process. In a photolithographic process, even though equal number of pulses are input to successive steps and repeated cycles, the amount of exposure varies each cycle, due to a fluctuation in the reproducibility according to the pulse cycles. It has been difficult so far to obtain a process which only has small fluctuation.

SUMMARY OF THE INVENTION

Accordingly, an object of the invention is to provide a device for controlling the output of a pulsed laser, and to improve the stability of the total amount of exposure in successive steps and repeated cycles.

The foregoing object is accomplished in one embodiment by providing, in a pulsed laser system in which the total irradiation energy of the laser is controlled by the number of the laser pulses, a device for controlling the output of the laser characterized in that the laser oscillation is stopped when the sum of the laser outputs, in response to each pulses has reached a predetermined level.

With this arrangement, it is possible to control total irradiation of a laser at a predetermined level, even though the reproducibility of the laser output to each input pulse is low.

DESCRIPTION OF THE PREFERRED EMBODIMENT

Figure 1:
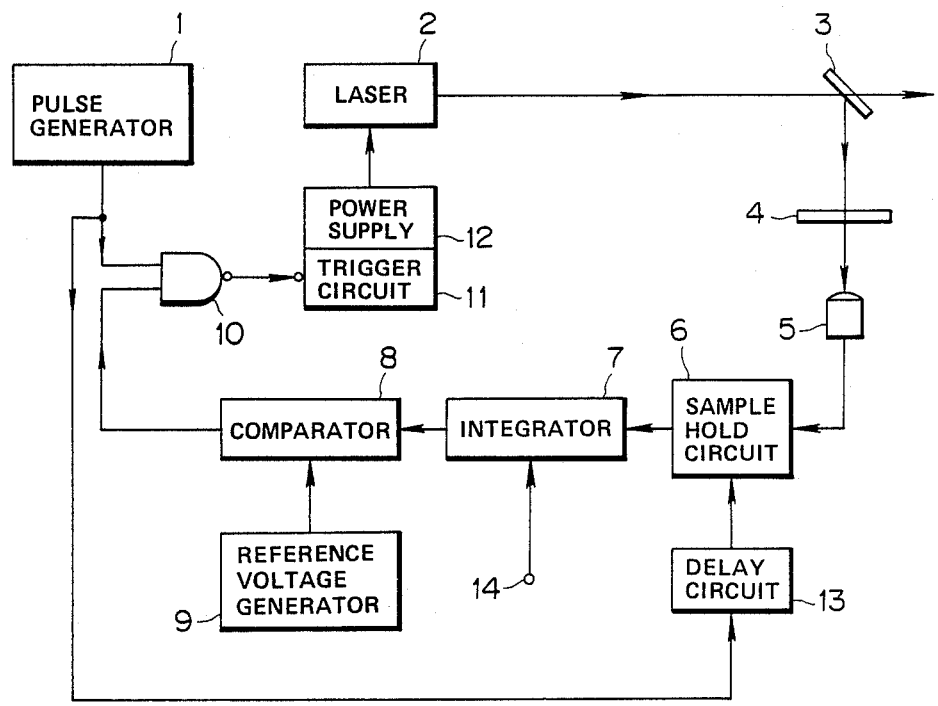
FIG. 1 is a block circuit diagram of an embodiment of the output power control system in a pulsed laser in accordance with this invention.

A preferred embodiment of the invention will be described hereinafter with reference to the accompanying drawings in which FIG. 1 is a block circuit diagram showing an embodiment of the output power control system of a pulsed laser, while FIGS. 2(a)–2(h) are a time chart illustrating the operation of the circuit shown in FIG. 1.

Figure 2:
FIGS. 2(a)–2(h) are a time charts illustrating the operation of this invention shown in FIG. 1.
Figure 2:
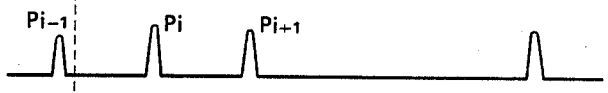
Figure 2:
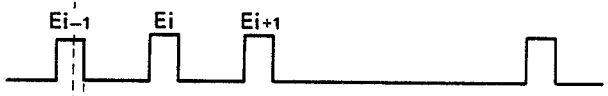
Figure 2:
Figure 2:
Figure 2:
Figure 2:
Figure 2:

In FIG. 2, graph 2(a) shows waveform of an output signal of a pulse generator 1, graph 2(b) shows the waveform of the output signal of a laser 2, graph 2(c) shows a waveform of output signal of an a sample hold circuit 6, graph 2(d) shows a waveform of an output signal of a delay circuit 13, graph 2(e) shows a waveform of an output signal of an integration device 7, graph 2(f) shows a waveform of an output signal of a comparator 8, graph 2(g) shows a waveform of an output signal of a NAND gate 10 and graph 2(h) shows a waveform of an output signal of an external reset terminal 14.

The output of a laser 2 is reflected by a mirror 3, and is input through a diffusion plate 4 into a photo-detector 5. This output signal is held for a predetermined time in a sample hold circuit 6 which in turn provides an output signal Ei in the form of a pulse train of a regular pulse interval. The height of the pulses vary due to fluctuation in the peak values Pi for the successive pulses (see FIGS. 2(b) and 2(c)).

The output signal from the sample hold circuit 6 is input to an integrator 7, the output Es of which has a level corresponding to the sum of the laser output energy. The output signal from the integrator 7 is compared by a comparator 8 with a reference level which is beforehand set by a reference voltage generator 9. When the level of the output Es coincides with the reference level, the output of the comparator 8 is reduced to zero, so that the NAND gate 10 is opened and the laser oscillation is stopped through the trigger circuit 11 and the power supply 12 (see FIGS. 2(e), 2(f) and 2(g)).

Then, as a signal is delivered to an external reset terminal 14, the output signal of the external reset terminal 14 is changed to zero. In this way the control of the total irradiation energy is conducted repetitionally as a suitable cycle (see FIGS. 2(h) and 2(e)).

The delay circuit 13 is for resetting a sample hold circuit 6 (see FIGS. 2(d) and 2(c)).

As will be seen from the foregoing description, according to the invention, the laser oscillation is terminated when the sum of the laser outputs in response to successive pulses has reached a predetermined level, thus maintaining the total radiation energy of the laser at a predetermined level.

Although only one embodiment of the invention has been disclosed and described, it is apparent that other embodiments and modification of the invention are possible.

What is claimed is:

1. A device for controlling the output of a pulsed laser, comprising:
   a laser oscillator outputs a laser beam in response to a repetitive pulse discharge;
   a photoelectric conversion means for converting the output laser beam into a pulse signal;
   a sample and integration means for sampling and integrating the laser output energy from the pulse signal of the photoelectric conversion means regardless of pulse width and height of the pulse signal;
   a reference voltage generating means for generating a predetermined reference level;
   a comparator compares the output of the sampling and integration means and the output from the reference voltage generating means;
   a pulse generator means for repetitionally outputting the consecutive pulses; and
   a control means for controlling an opening and closing of the laser oscillator based on said consecutive pulses from said pulse generator means and an output of said comparator wherein a constant total output power of said laser oscillator is maintained at said predetermined reference level.

2. The device according to claim 1, wherein the sampling and integration means includes a sample hold circuit and an integrator for determining the sum of the laser energy output, the sample hold circuit being reset as it detects the pulse from the pulse generator means through a delay circuit.

3. A device for controlling the output of a pulsed laser comprising:
   a pulse generator means for outputting repetitive consecutive pulses;
   a laser oscillator outputs a laser beam in response to said repetitive consecutive pulses from said pulse generator means;
   a photoelectric conversion means for converting said output laser beam into a pulse signal;
   a sampling and integration means for sampling and integrating an output from said photoelectric conversion means to determine a sum of said laser oscillator energy output in response to said repetitive consecutive pulses regardless of pulse width and height;
   a reference voltage generating means for generating a predetermined reference level;
   a comparator compares the output of the sampling and integration means and the generated predetermined reference level from the reference voltage generating means wherein, when said sum of laser energy output from said sampling and integration means equals said predetermined reference level, an output of said comparator is reduced to zero; and
   a control means for controlling an opening and closing of the laser oscillator based on said repetitive consecutive pulses from said pulse generator means and said output of said comparator, wherein said laser oscillator is terminated when said sum of laser energy outputs of said sampling and integration means reaches said predetermined level so that a constant total output power of said laser oscillator is maintained at said predetermined reference level.

* * * * *